United States Patent [19]
Demarest et al.

[11] Patent Number: 5,513,465
[45] Date of Patent: May 7, 1996

[54] METHOD AND APPARATUS FOR CATCHING INSECTS

[75] Inventors: Scott W. Demarest, Racine, Wis.; William J. Mayer, South Barrington; Dennis W. Gruber, Arlington Heights, both of Ill.; Donald E. McCumber, Madison, Wis.; Joseph E. Reimer, Oregon, Wis.; Karl A. Kohler, Racine, Wis.

[73] Assignee: S. C. Johnson & Son, Inc., Racine, Wis.

[21] Appl. No.: 168,432

[22] Filed: Dec. 17, 1993

[51] Int. Cl.⁶ .................................................. A01M 1/04
[52] U.S. Cl. .................................................. 43/113; 43/114
[58] Field of Search .............................. 43/113, 114, 115, 43/116, 117

[56] References Cited

U.S. PATENT DOCUMENTS

| | | |
|---|---|---|
| 389,482 | 9/1888 | Owens . |
| 670,996 | 4/1901 | Morgan ..................................... 43/113 |
| 1,165,251 | 12/1915 | Harris . |
| 1,701,674 | 2/1929 | Hitosi . |
| 1,819,551 | 8/1931 | Gourdon ................................... 43/113 |
| 1,820,813 | 8/1931 | Loomis . |
| 3,023,539 | 3/1962 | Emerson .................................. 43/113 |
| 4,117,624 | 10/1978 | Phillips ..................................... 43/113 |
| 4,556,010 | 12/1985 | Persson .................................... 43/113 |
| 4,566,220 | 1/1986 | Justice ...................................... 43/113 |
| 4,654,998 | 4/1987 | Clay . |
| 4,686,789 | 8/1987 | Williams . |
| 4,700,506 | 10/1987 | Williams . |
| 4,918,856 | 4/1990 | Olive et al. . |
| 4,979,329 | 12/1990 | Olive . |
| 5,044,112 | 9/1991 | Williams . |
| 5,142,815 | 9/1992 | Birdsong ................................... 43/114 |
| 5,184,417 | 2/1993 | Weldon . |
| 5,205,064 | 4/1993 | Nolen . |
| 5,231,790 | 8/1993 | Dryden et al. . |
| 5,311,696 | 5/1994 | Gauthier ................................... 43/113 |

FOREIGN PATENT DOCUMENTS

| | | | |
|---|---|---|---|
| 458659 | 10/1913 | France . | |
| 6054635 | 3/1994 | Japan ....................................... | 43/114 |

OTHER PUBLICATIONS

Advertisement for "The Terminator" Flea Trap as appeared in USA Weekend, issue dated May 14–16, 1993.

Product information pages from BioCare Product, Ltd.

Weste L. A. Osbrink and Michael K. Rust, *Cat Flea (Siuphonaptera: Pulicidae): Factors Influencing Host–Finding Behavior in the Laboratory*, Ann. Entomol, Soc. Am 78:29≧34 (1985).

G. E. Crum, F.W. Knapp and G. M. White, *Response of the Cat Flea, Ctenocephalides Felis (Bouche), and the Oriental Rat Flea, Xenopsylla cheopis (Rothchild), to Electromagnetic Radiation in the 300–700 Nanometer Range*, Mar. 28, 1974, J. Med. Eng. vol. 11, No. 1: 88–94.

L. G. Pickens, J.F. Carrpoll & A. Farhang Azad, *Electrophysiological studies of the spectral sensitivites of cat flea, Ctenocephalides felis, and oriental rat fleas, Xenopsylla cheopis to monochromatic light*, Entomol, exp. appl 45; 193–204, 1987.

*Primary Examiner*—Kurt Rowan

[57] ABSTRACT

An insect trap having a back portion and a base portion oriented at essentially right angles to each other. The trap back portion contains a light source to attract insects, especially fleas, to the trap and the trap base portion contains an insect structure which bears on its surface an adhesive material for trapping the insects attracted to the trap. The trap back and base portions may be configured so that they may be folded against each other when the trap is not in use.

90 Claims, 9 Drawing Sheets

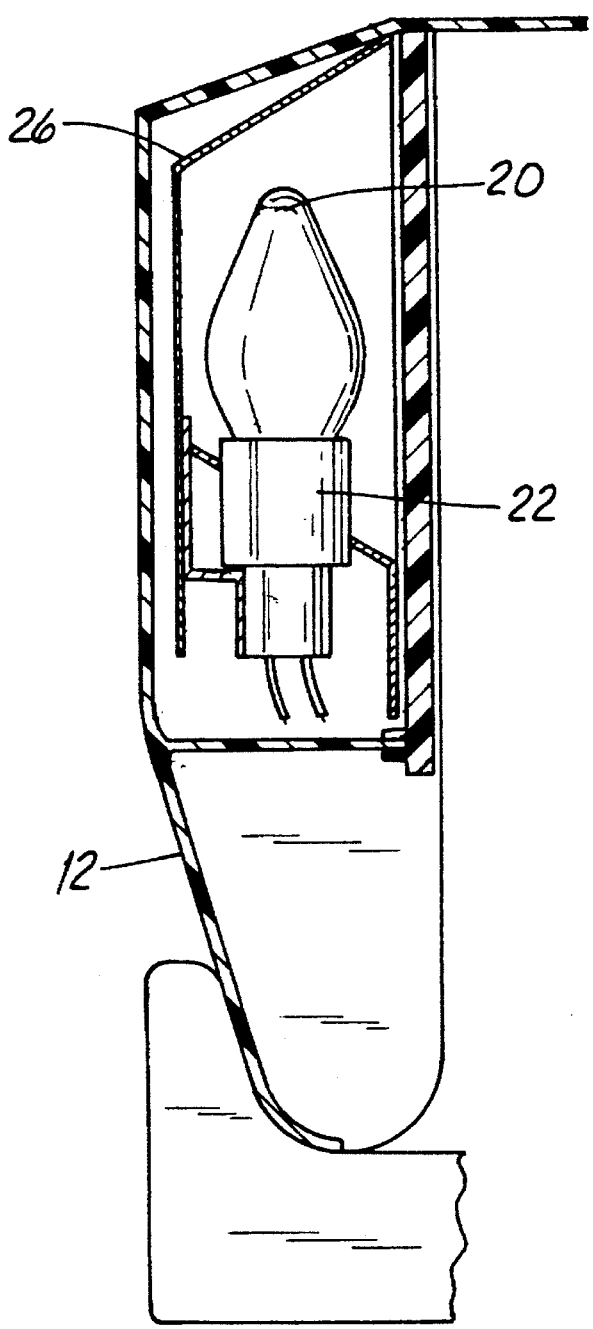
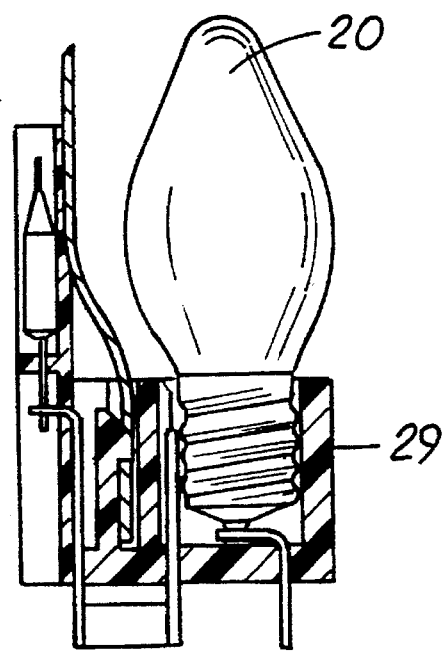
FIG. 3
FIG. 3A

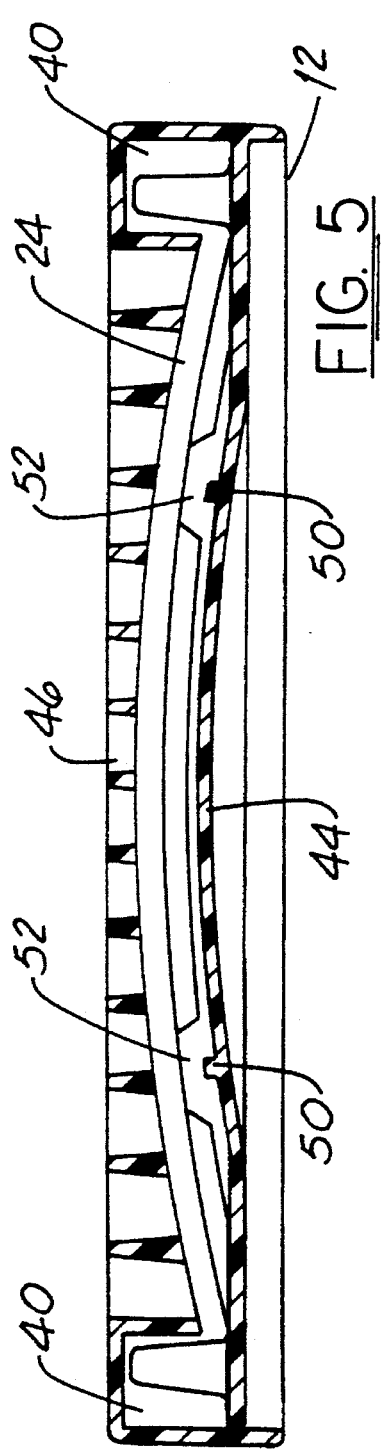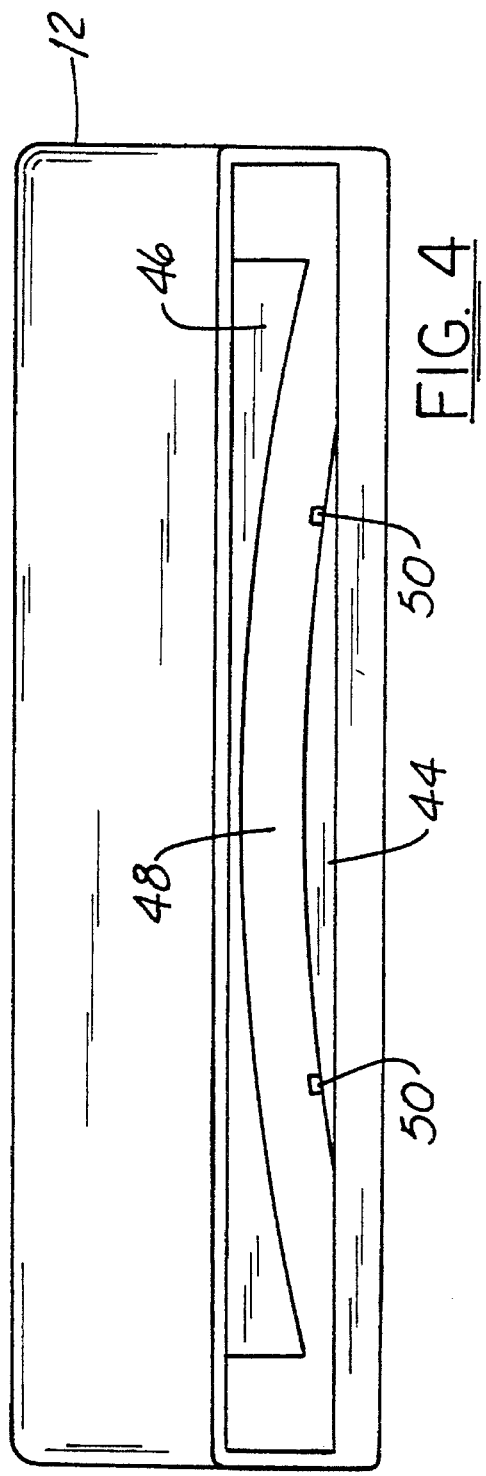

METHOD AND APPARATUS FOR CATCHING INSECTS

TECHNICAL FIELD

This invention relates to the field of insect control and particularly to a flea trap that contains a light source which attracts fleas to the top and a surface covered with a sticky material upon which the fleas become stuck and die.

BACKGROUND ART

Fleas—small biting insects that feed upon warm blooded and preferably furry mammals—have probably been a problem for animals and for mankind since before recorded history. At one end of the problem spectrum is the danger of the spread of bubonic plague by fleas. Somewhat at the other end of the spectrum is the discomfort caused by flea bites to domestic animals and to the humans who care for them.

It is well known that insects of many kinds can be killed by being attracted to a sticky surface upon which they then get stuck. Fly paper is the best known example of this method of insect control.

It has been known for some time that light and especially green light attracts fleas. See, for example, "Response of the Cat Flea, *Ctenocephalides Felis* (Bouche), and the Oriental Rat Flea, *Xenopsylla Cheopis* (Rothschild), to Electromagnetic Radiation in the 300–700 Nanometer Range", by G. E. Crum, F. W. Knapp and G. M. White.

The responsiveness of fleas to "moving" targets has also been documented. Fleas were found to be reactive to a black target which was moved across a lighted background—an indication that fleas are not only responsive to light but to perceived changes in light. See "Cat Flea (Siphonaptera: Pulicidae): Factors Influencing Host-finding Behavior in the Laboratory", by Osbrink and Rust, Ann. Entomol. Soc. Am 78: 29–34 (1985).

U.S. Pat. No. 1,701,674, "Automatic Insect Trap Using Lamps", to Hitosi, discloses an insect trap using a light as an attracting means. The light can be an electric lamp, a candle or the like.

Recently, several varieties of fleas traps combining the use of light as an attractant and a sticky surface to trap the fleas have been patented and marketed.

U.S. Pat. No. 4,566,220, "Insect Trap", to Justice, discloses a trap for catching wingless non-flying fleas comprising a trapping means having an accessible sticky surface, a light reflecting cover supported over, opposing and vertically spaced above the trapping means so as to provide open unobstructed space around the trapping means to permit fleas to jump towards the trapping means, and an electrically energized visible green light source supported over the trapping means beneath the light reflecting cover for generating both downwardly directed reflected green light and directly radiated green light for attracting fleas to jump toward and to the sticky surface.

U.S. Pat. No. 5,044,112, "Flea Trap Utilizing Night-Light" to Williams, discloses a trap for catching fleas comprising an electrically energized light source having a pair of horizontal prongs for installation in an electrical receptacle and a bulb housing secured to and supported by the prongs which enclose an electrically conductive bulb socket electrically connected to the prongs, a light reflector supported by the housing having a hook means and being oriented to the bulb to provide a horizontal reflecting surface above the bulb, and means providing a sticky landing surface located beneath the light source.

U.S. Pat. No. 4,700,506, "Flea Trap" to Williams, discloses a flea trap comprising a shallow pan, a sticky substance disposed in the pan, a cover having a light reflective horizontal bottom surface and spaced apart holes extending through the surface, a support means of wire-formed leg members which pass through the holes in the cover and grasp the edges of the pan, and an electrically energized visible light source secured to the cover below the light reflective surface to generate both reflected downwardly and outwardly transmitted light.

U.S. Pat. No. 4,686,789, "Insect Trap", to Williams, disclosed a trap for catching insects comprising a rectangular shallow pan with a pair of spaced apart holes, a sticky substance disposed in the pan, a rectangular cover of selected color having a light reflective horizontal bottom surface of selected color with a spaced apart pair of holes extending through the surface, a support means comprising a pair of wire-formed leg members for connection to the holes in the cover and in the pan in a specified manner, an electrically energized visible light source secured to the cover below the light reflective surface to provide reflected downwardly transmitted light and downwardly and outwardly transmitted light.

U.S. Pat. No. 4,654,998, "Device for Attracting and Trapping Fleas", to Clay, discloses a device for attracting and trapping fleas comprising a housing assembly, an attractant means located in the housing assembly, and a trapping medium means located in the housing assembly including a pan member, a top member spaced from the pan member and an open mesh screen means.

U.S. Pat. Nos. 4,918,856, "Insect Trap for Fleas or the Like", and 4,979,329, "Insect Trap for Fleas or the Like", both to Olive et al., disclose traps for catching insects, both comprising a self-contained source of radiation which produces a gradually decaying form of light.

SUMMARY DISCLOSURE OF INVENTION

The present invention provides a flea trap having a flea-attracting light source and an adhesive trapping surface located upon an insert, that is both functionally effective and has many safety and convenience features.

Accordingly, it is an object of the invention to provide an effective, compact, durable flea trap.

Another object is to provide such a flea trap that has both an open (in which the light source and the adhesive surface area positions are spaced apart to allow the fleas access to the adhesive surface) and a closed (in which the light source and the adhesive surface area positions are folded or otherwise placed in close proximity to each other to maximize convenience in storage and shipping of the device) position.

It is a further object of the invention to provide a flea trap that has an easily removed and replaceable adhesive trapping surface element.

Another object of the invention is to provide a flea trap that has both the light source and the adhesive surface area protected from easy access by children or pets for safe operation of the trap.

BRIEF DESCRIPTION OF THE DRAWINGS

FIG. 3 is a side sectional view of the cover and light source components of the flea trap of FIG. 1.

FIG. 3A is a side sectional view of a light source variation of the flea trap.

FIG. 4 is a front elevational view of the base portion of the flea trap.

FIG. 5 is a front sectional view of the base portion of the flea trap showing the insert placed therein.

BEST MODE FOR CARRYING OUT THE INVENTION

Figure 1:
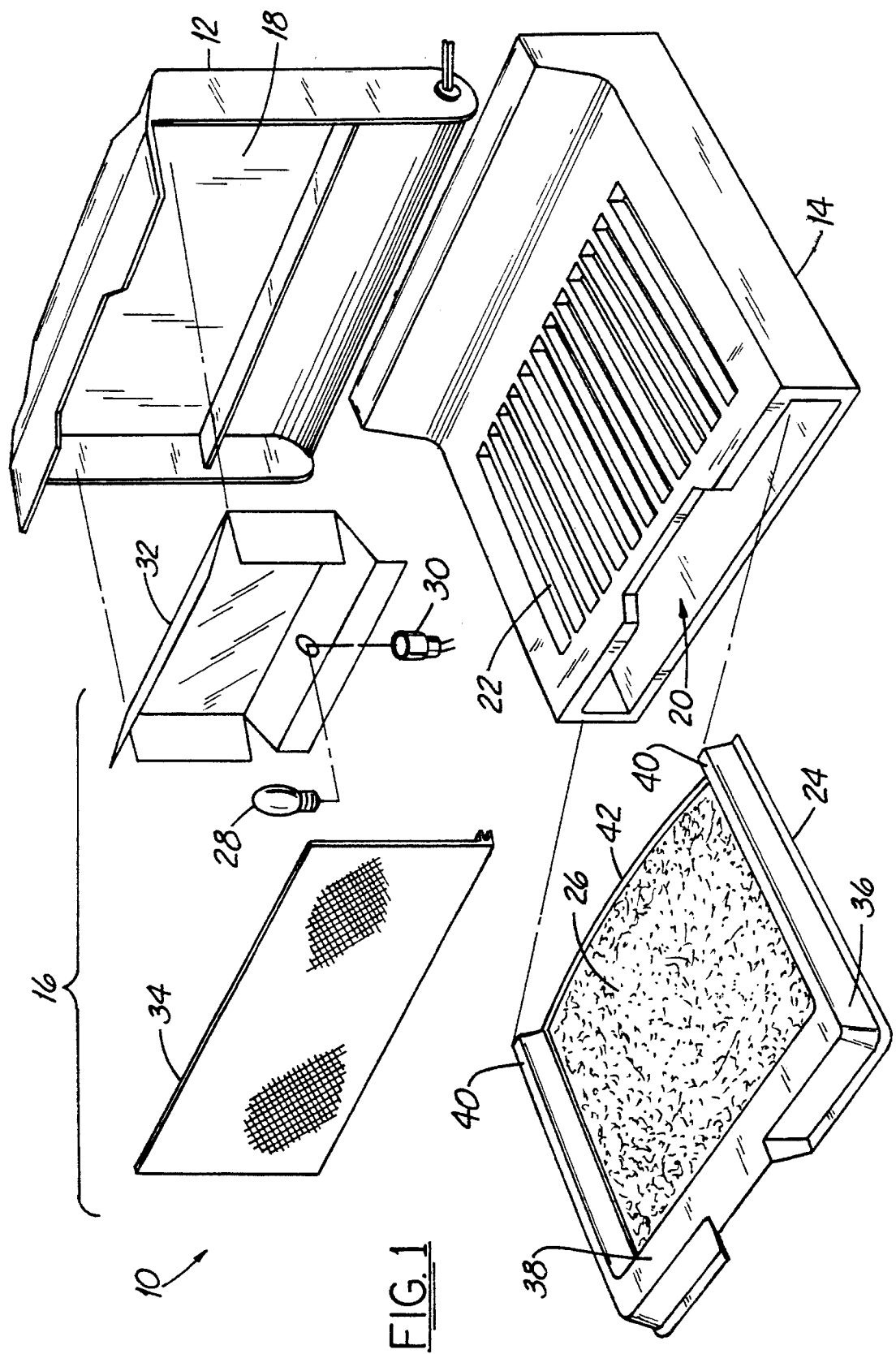
FIG. 1 is an exploded perspective of a first embodiment of the flea trap in the open position.

In the detailed description of the drawings of the best mode for carrying out the invention, like reference numbers are used on the different figures to refer to like parts. Parts or features that are functionally similar but differ slightly in structure and/or location are indicated within the reference numbers followed by lower case letters. Traps that are essentially and externally structurally similar but have different types of light sources are referred to as variations while traps having structural differences are referred to as embodiments.

The preferred embodiment of the flea trap uses an incandescent light source for simplicity and economy. However, the use of an LED (light emitting diode) light source is possible and has many advantages. LED's, which are solid state components, last longer and are not as fragile as incandescent bulbs, and produce minimal heat (a potential product safety concern).

While it might be expected that the essentially directional character of LED light would limit its effectiveness in a flea trap, testing has proved that this is not a factor and that traps utilizing a LED light source are efficacious for attracting and trapping fleas.

The light source of all embodiments of the flea trap, as well as being at least one incandescent bulb or an LED could also be neon, fluorescent, electro-chemical, or electro-luminescent. The only restriction on the light source is that the emitted light must contain wave lengths that fleas find attractive and the emitted light must radiate outward from the trap in a direction and orientation such that the light will be perceived by the fleas so that they will be attracted to it. Both white light and green light sources were tested and proved to be effective for attracting fleas. However, a trap having a green light source proved to be less intrusive and irritating to users of the trap.

Other possible variations of the light source are structural. The light source could, for example, be located in the base portion of the trap and the light projected to a reflector in the cover portion, which would then redirect the reflected light outward. This variation has been tested and proved to be effective.

Testing of the flea trap was conducted both under controlled laboratory conditions and in flea-infested homes. In the flea-infested homes the traps proved very effective at controlling flea populations by sheer removal of host-seeking fleas. Interestingly, it appeared that the traps provided "flea protection-relief" to humans, for, given a choice, fleas seemed to be more attracted to the lighted flea trap than to a human. In testing in homes, spiders were frequently observed trapped in the adhesive material, as well as some German roaches and ants. Another interesting observation was noted in a research test: when the lighted trap was accidentally placed next to a source of pavement ants who were producing winged reproductives, those winged reproductives were attracted to and caught by the trap. The trap should thus also prove effective for other insects which are similarly in a winged reproductive mode.

The preferred embodiment of the flea trap, as described in more detail below, has cover and base portions, a single, replaceable incandescent bulb located within the cover portion, and an adhesive-bearing insert structure, which is inserted into the base portion of the trap.

FIG. 1 is an exploded perspective of the preferred embodiment of the invention. Flea trap 10 has an outer housing made up of two main components: trap cover portion 12 and trap base portion 14, both preferably formed of thermoplastic material. In this and all other embodiments and variations of flea trap 10, trap cover portion 12 and trap base portion 14 are oriented at essentially right angles to each other. This configuration proves to be both convenient and effective. The flea trap of the invention is intended to be placed on or near the floor of a room, for that is where such fleas as are not currently residing on a host or hiding in furniture or the like will be. The upright back of the trap can be placed against a wall or piece of furniture and oriented so that rays of light emitted from the trap extend outwardly into the room. Light source 16 and all other electrical components are contained within trap cover inner recess 18.

Trap base portion 14 has trap base inner recess 20 which is partially covered by trap grill structure 22, which is itself formed into trap base portion 14. Disposable insert structure 24, which carries on its upper surface adhesive material 26, fits removably into trap base inner recess 20, in a manner that will be described in more detail below. The existence of trap grill structure 22 prevents children or pets from coming into contact with adhesive material 26, while allowing attracted fleas to fall through trap grill structure 22 and become stuck in adhesive material 26.

Light source 16 is made up of two main components: incandescent bulb 28 which is inserted into bulb socket 30, which is itself connected, by means of the usual circuitry, to a source of electric power. Alternating current from a wall socket is the preferred and expected type of power source for the trap, but, with appropriate circuitry, the use of DC current from batteries is also feasible. Reflector 32 (which also functions as a heat shield) is positioned within trap cover portion 12 behind incandescent bulb 28. Protector screen 34 (which also functions as a light diffuser screen) is positioned within trap cover portion 12 in front of incandescent bulb 28 and protects the bulb from breakage or from being accessed by children or pets. For the flea trap having an incandescent bulb light source to have a useful functional life, the incandescent bulbs will need to be replaced during the lifetime of the trap. For this reason, protector screen 34 is made to be removable by the user of the trap.

The preferred type of single incandescent bulb for use in the trap is a night-light type bulb with either a candleabra screw-in base or a bayonet twist-in base. The trap was tested and proved effective with either four or seven watt bulbs.

When light source 16 is incandescent, there are two ways in which green emitted light can be obtained: the incandescent bulb 28 itself can be green, or the incandescent bulb can be white and protector screen 34 green.

A possible option that could be incorporated into any of the variations of the preferred embodiment of the flea trap would be a mechanical on-off switch which would activate the light source when flea trap 10 was fully opened (trap cover portion 12 and trap base portion 14 at essentially right angles to each other) and turn the light source off when flea trap 10 was in its closed position (trap cover portion 12 and trap base portion 14 resting against each other).

Another possible option would be the incorporation of a thermal cut-off fuse in any of the incandescent trap variations or embodiments. Such a device, which would be located within the cover portion of the trap, would inactivate the unit if a particular temperature were ever reached, to further minimize any possibility of heat damage by the unit.

Insert structure 24, fits into trap base inner recess 20 over insert guide structure 44. Insert structure 24 is, although removably placed into flea trap be, guided into base inner recess 20 and held in place by a combination of guiding and placement mechanisms which are shown in greater detail in FIGS. 4 & 5. These mechanisms, among other things, prevent adhesive material 30 from coming into contact with the underside of trap grill structure 22. Insert structure 24, as can be seen in FIGS. 1 and 5, has, all preferably formed as a continuous unit of thermoplastic material, insert perimeter wall structure 36 which is composed of wall front section 38 and wall insert side sections 40 and insert central area 42, upon which adhesive material 26 is placed. Insert central area 42 has a convex configuration. As may be most easily seen in FIG. 4, all located within base inner recess 20 are convex insert placement guide structure 44, located upon the bottom of base inner recess 24 and concave insert placement guide structure 46, which extends downward from the inner top side of base inner recess 20 which together define curved insert slot 48 into which insert structure 24 removably fits. Located upon convex insert placement structure 44 are insert guide ribs 50 which, when insert structure 24 is inserted into base inner recess 20, mate with insert guide channels 52 formed into the housing of insert structure 24.

The positioning and shapes taken by the "lock and key" mechanism made up of convex insert placement guide 44, concave insert placement guide 46 and curved insert slot 48 can easily be varied: the relative positions of the convex and concave guides may be reversed to define a concave slot into which a concavely configured insert may be fitted, or the guides may be configured to define an angular or jagged slot, into which an angular or jaggedly configured insert may be placed.

Whatever the exact configuration chosen, the non-planar configuration of insert central area 42, in addition to making the "lock and key" fit between insert structure 24 and insert guides 44 and 48 more precise, also serves to provide a greater surface area for adhesive material 26 and increases structural rigidity of the insert structure 24.

Trap cover portion 12 and trap base portion 14 are movably connected by a hinging means. The exact configuration of the hinging means is not an essential part of this invention: any conventional type of hinging mechanism may be used. Therefore, for simplicity, details of the hinging means have been omitted from the drawings.

Adhesive material 26 may, for protection, be covered by a release liner, which would be removed by the user before placing the trap into operation.

In all variations of the preferred embodiment of the flea trap, trap grill structure 22 is integrally formed into trap base portion 14, for economy and simplicity of manufacturing. However, the grill portion and the base portion could also be formed as separate units, which would be fitted together to achieve the configuration of the flea trap of the present invention.

Figure 2:
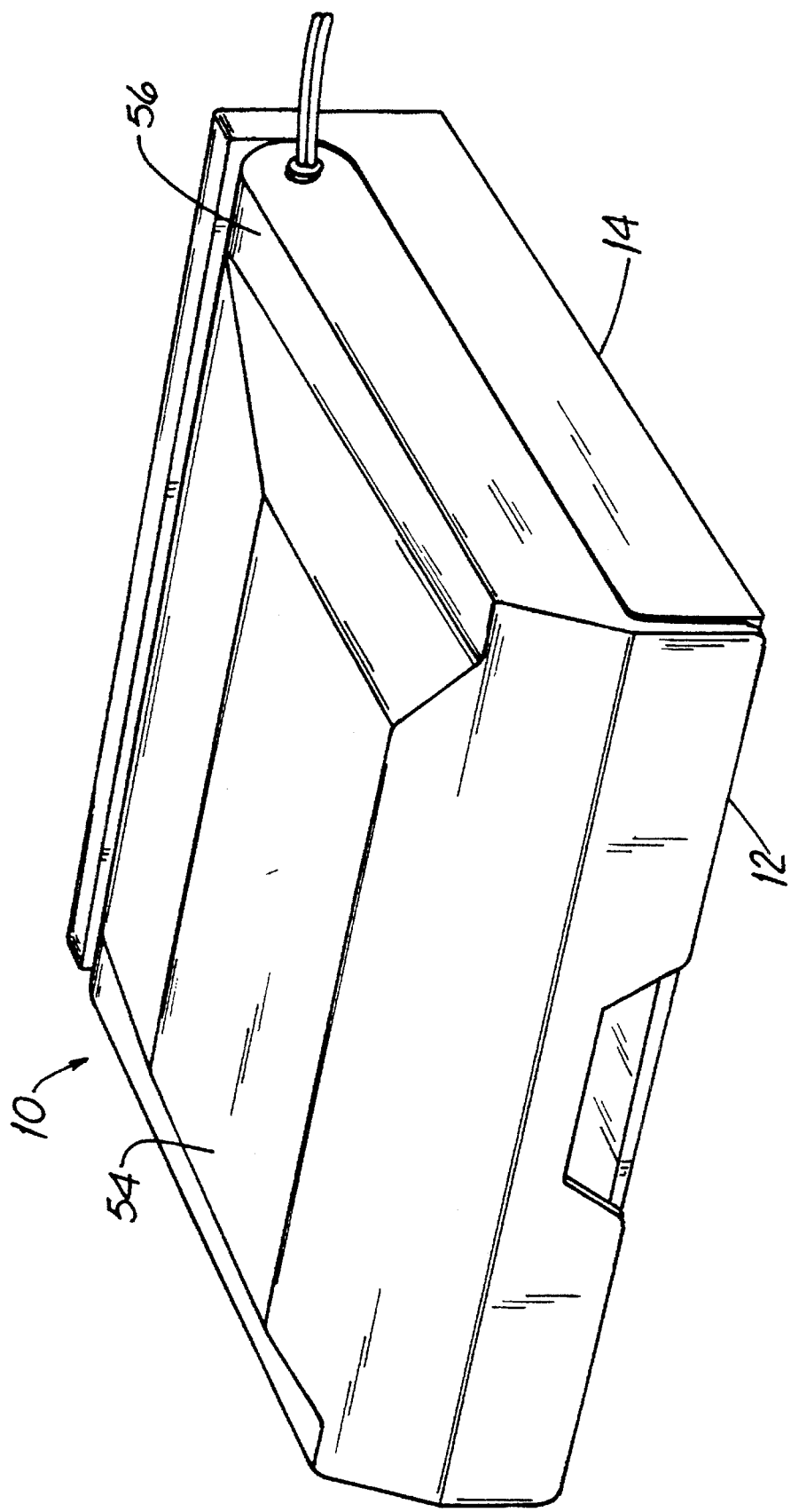
FIG. 2 is a perspective drawing of the flea trap of FIG. 1 in the closed position.

FIG. 2 shows the embodiment of flea trap 10 illustrated by FIG. 1 in the closed position. As this figure shows, trap cover portion 12 has trap cover central area 54 and trap cover perimeter area 56. The increased depth of this configuration (as compared to the trap cover configuration shown in FIG. 8) serves two purposes: extra room for the incandescent light source components and extra separation between the incandescent bulb and the plastic and metal materials of the trap cover. This separation allows more room for heat dissipation and, along with the existence of reflector 32 minimizes the chances of overheating of the trap and resulting heat or even fire damage to the trap or its surroundings.

Not shown, for the sake of simplicity, in any of the figures but an important although conventionally well known safety function for any electrical device that produces heat is a means for providing venting (and cooling) of the light source and other associated electrical components. In the flea trap of the present invention, this is accomplished by providing an air gap or hole at the lower end of the covering of the light source and another such gap or hole toward the top end of the light source. This structure allows ambient air to be pulled across the light source itself by the convection current set up by the heat produced by the light source.

FIG. 3 is a simplified side sectional view of the flea trap of FIG. 1 showing the way in which incandescent bulb 28, bulb socket 30 and reflector 32 fit into trap cover portion 12 behind protector screen 34. (Electrical circuitry has been omitted).

FIG. 3A shows a minor variation of the light source illustrated in FIG. 3. In this variation, incandescent light socket and its circuitry have been embedded into single insert molded module 29 formed of plastic material. This consolidation of several components eliminates the need to hard wire the separate components together and results in simplified construction, improved quality, and cost savings.

FIG. 4 is a simplified front elevational view of trap base portion 14 looking into trap base inner recess 20 and showing convex insert placement guide 44 and concave insert placement guide 46 which together define curved insert slot 48.

FIG. 5 shows a sectional view of trap base portion 14 showing insert structure 24 located within trap base inner recess 20.

Figure 6:
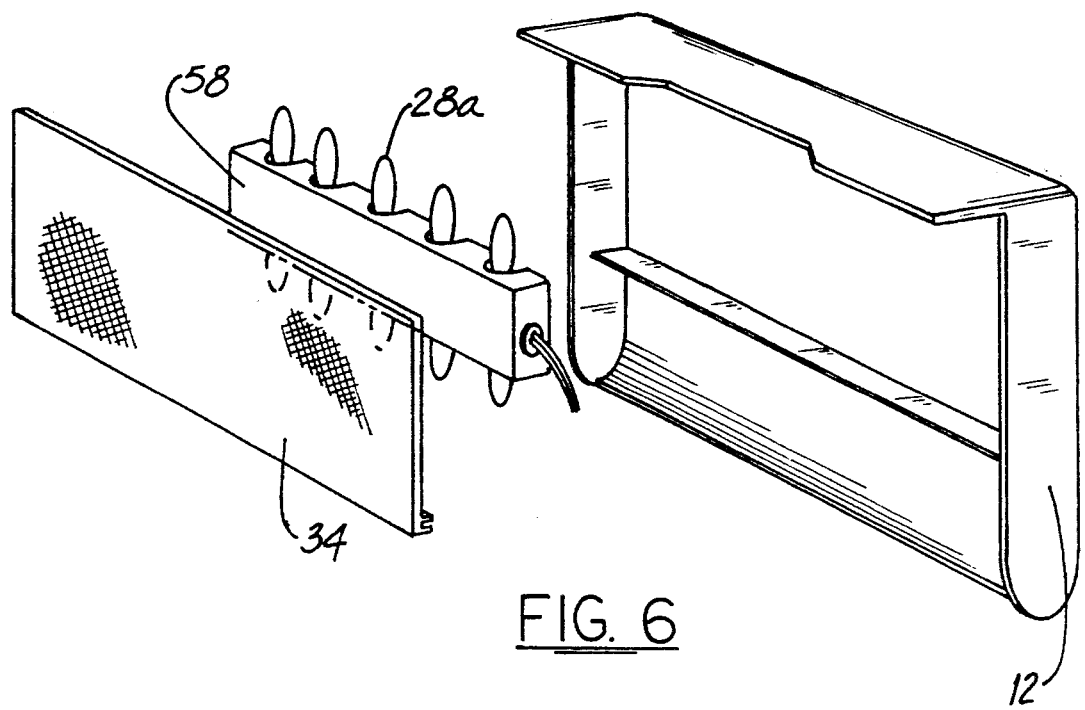
FIG. 6 is an exploded sectional view of the light source components of a third light source variation of the flea trap.

FIG. 6 is a variation of the flea trap of FIG. 1. All structural elements are the same with the exception of the light source itself. Instead of single incandescent bulb 28 shown in FIG. 1, this variation has a light source, composed of an array of multiple small incandescent bulbs 28a which can be hard wired together or mounted on a printed wiring board (circuit board), and are held in place within trap cover portion 12 by bulb enclosure 58.

The preferred type of incandescent bulb for use with a multiple unit array is the miniature one watt "Christmas tree light" bulb.

Reflector 32, is not shown in this variation, for the heat produced by the multiple incandescent light array is more evenly distributed than heat produced by the single, higher wattage, incandescent bulb variation of FIGS. 1 and 2 and thus less space for heat dissipation is needed.

Figure 7:
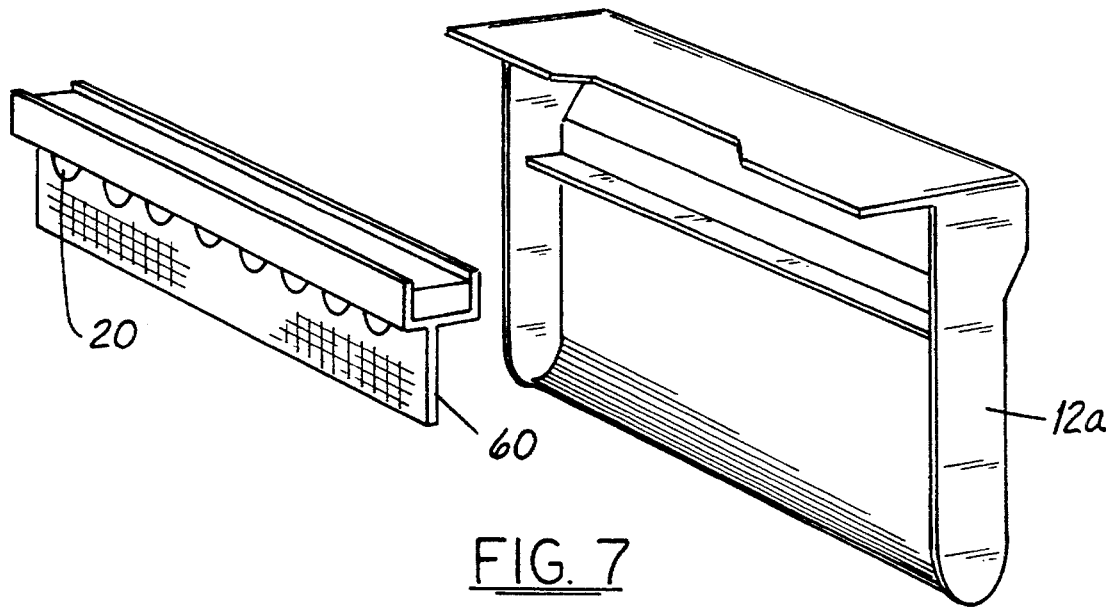
FIG. 7 is a perspective view of the light source components of a fourth light source variation of the flea trap.

FIG. 7 shows a second possible variation of the flea trap of FIG. 1. In this variation, the light source is a series of LED units 28b which have been embedded into a light screen 60 so that light emitted from the LED units is transmitted into and illuminates light screen 60.

Figure 8:
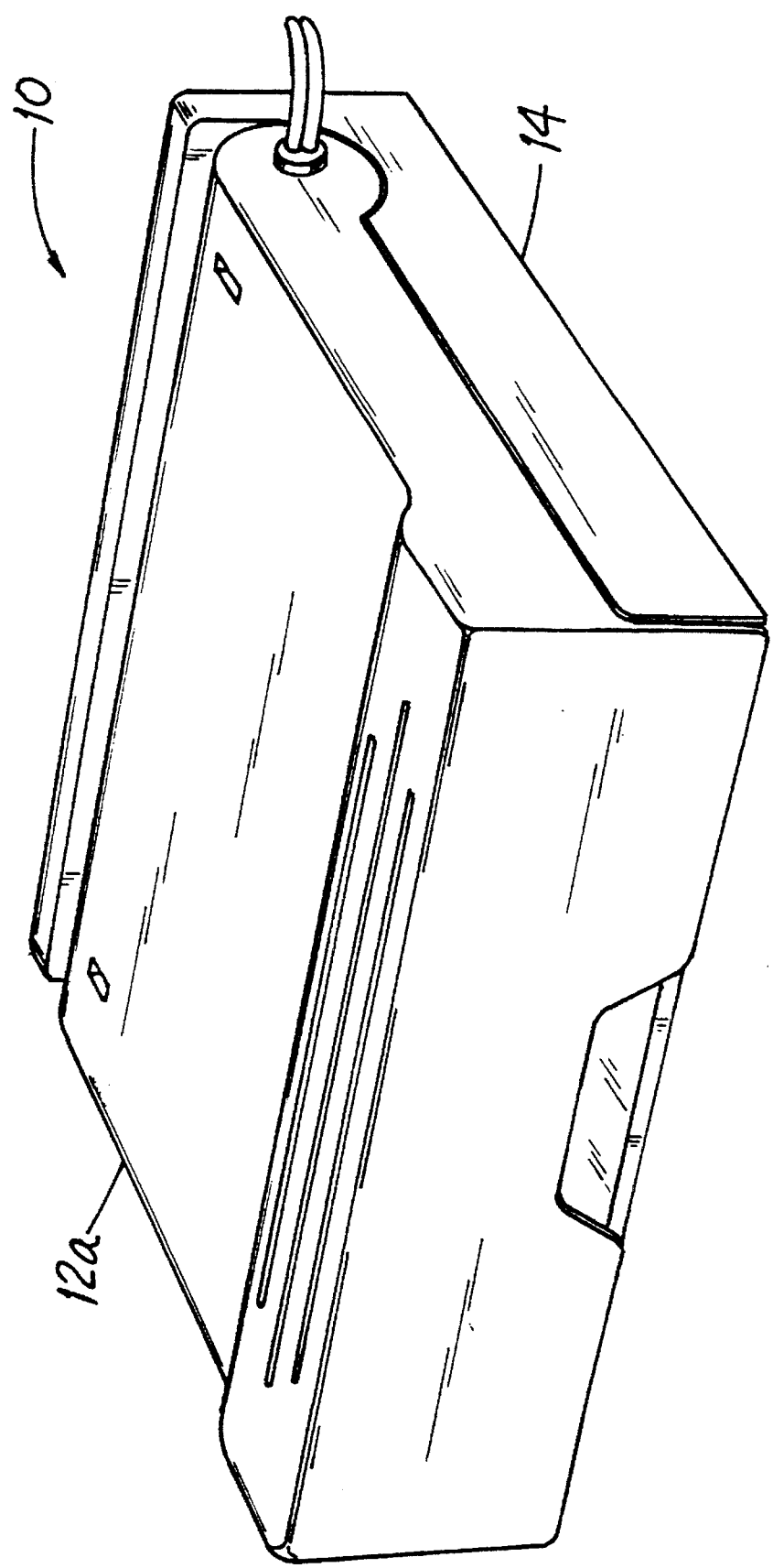
FIG. 8 is a perspective view of the flea trap variation of FIG. 7 in the closed position.

FIG. 8 shows the embodiment of flea trap 10 illustrated by FIG. 7 in the closed position. The difference between the closed embodiment illustrated in FIG. 2 and that illustrated by FIG. 8 is in the different configurations of top cover portion 12 in FIG. 1 and 12a in FIG. 8. Top cover portion 12a lacks raised trap cover central area 54, since the increased depth provided by trap cover central area 54 was found not to be necessary when an LED light source was used.

Figure 9:
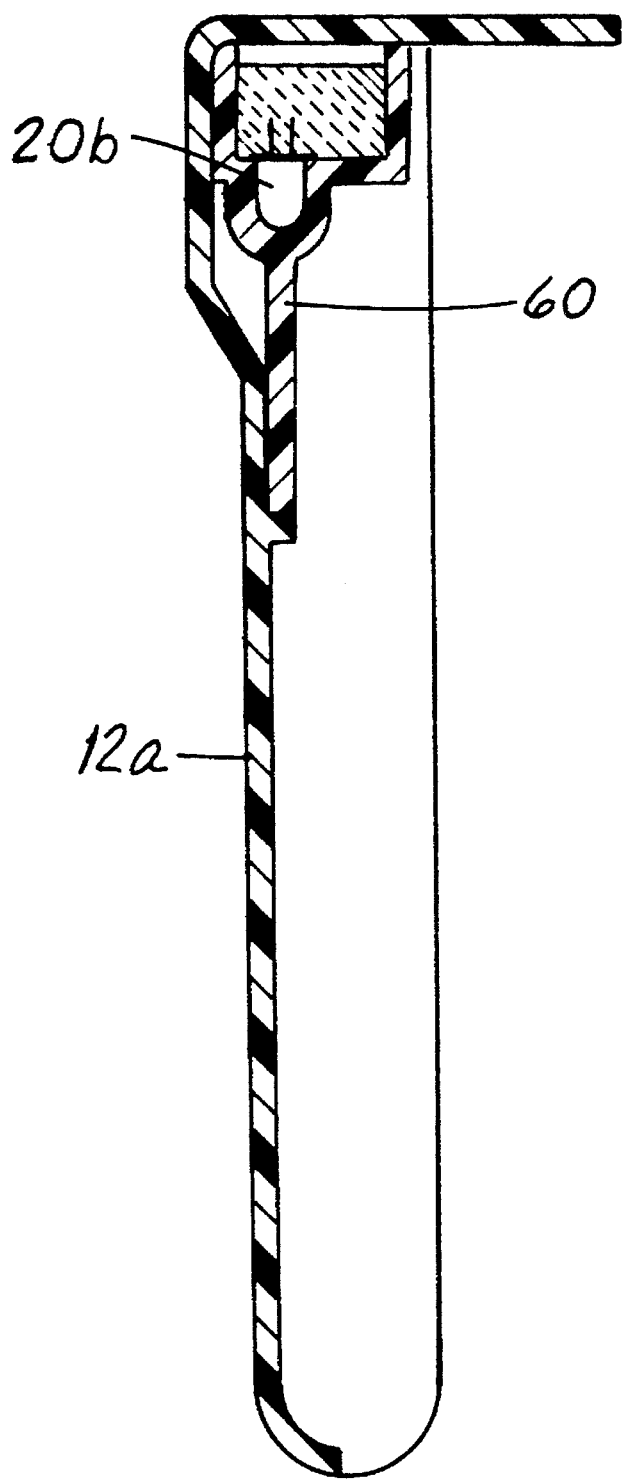
FIG. 9 is a side sectional view of the cover and light source components of the flea trap variation of FIG. 7.

FIG. 9 shows a side sectional view of the LED embodiment of the flea trap shown in FIG. 7. As this figure shows, LED light source 20b and its associated electrical components are embedded into light screen 60.

Figure 10:
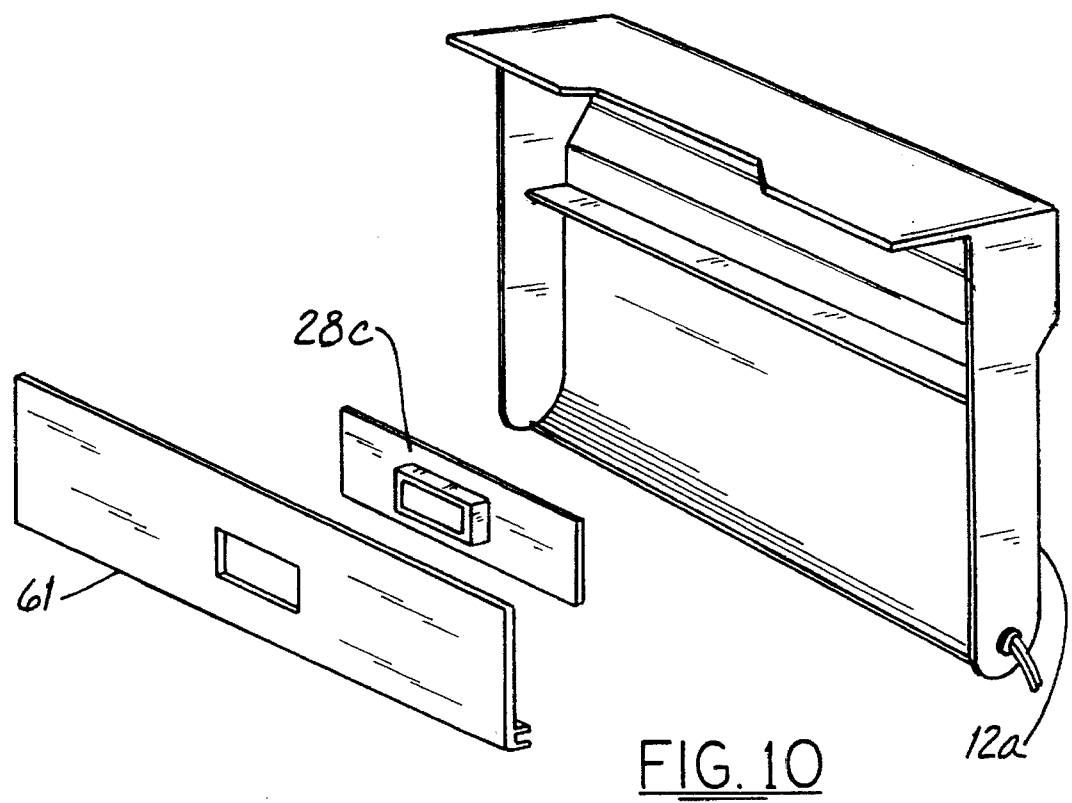
FIG. 10 is an exploded perspective of the light source components of a fifth light source variation of the flea trap.

FIG. 10 shows another possible LED light source variation. Light source 16, located within trap cover portion 12 is, in this variation, made up of LED light bar 28c, a commercial component available from such sources as Hewlett Packard. Light bar 28c in this variation is partially located behind bezel 61.

Figure 12:
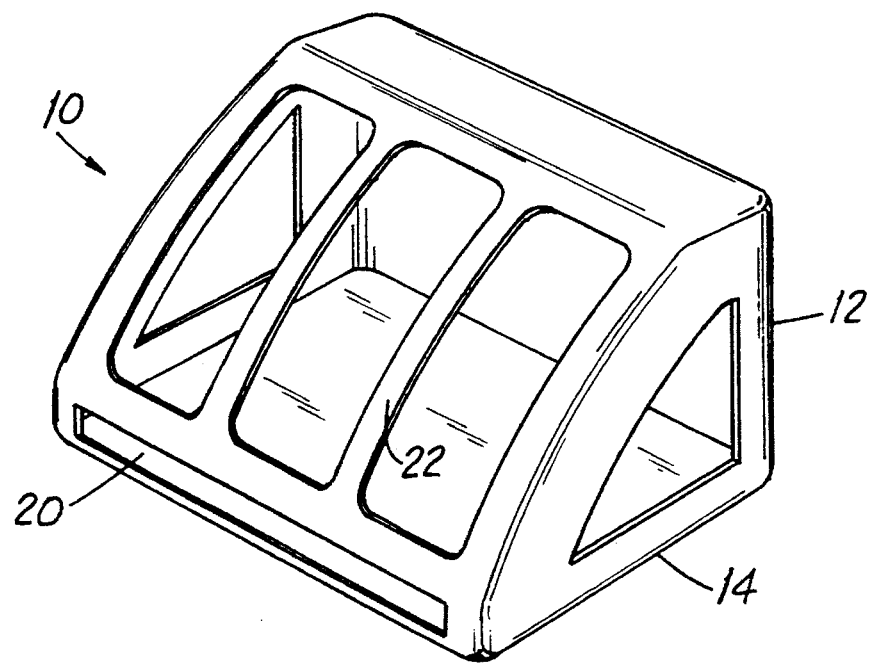
FIG. 12 is a perspective drawing of a third structural embodiment of the flea trap.
Figure 11:
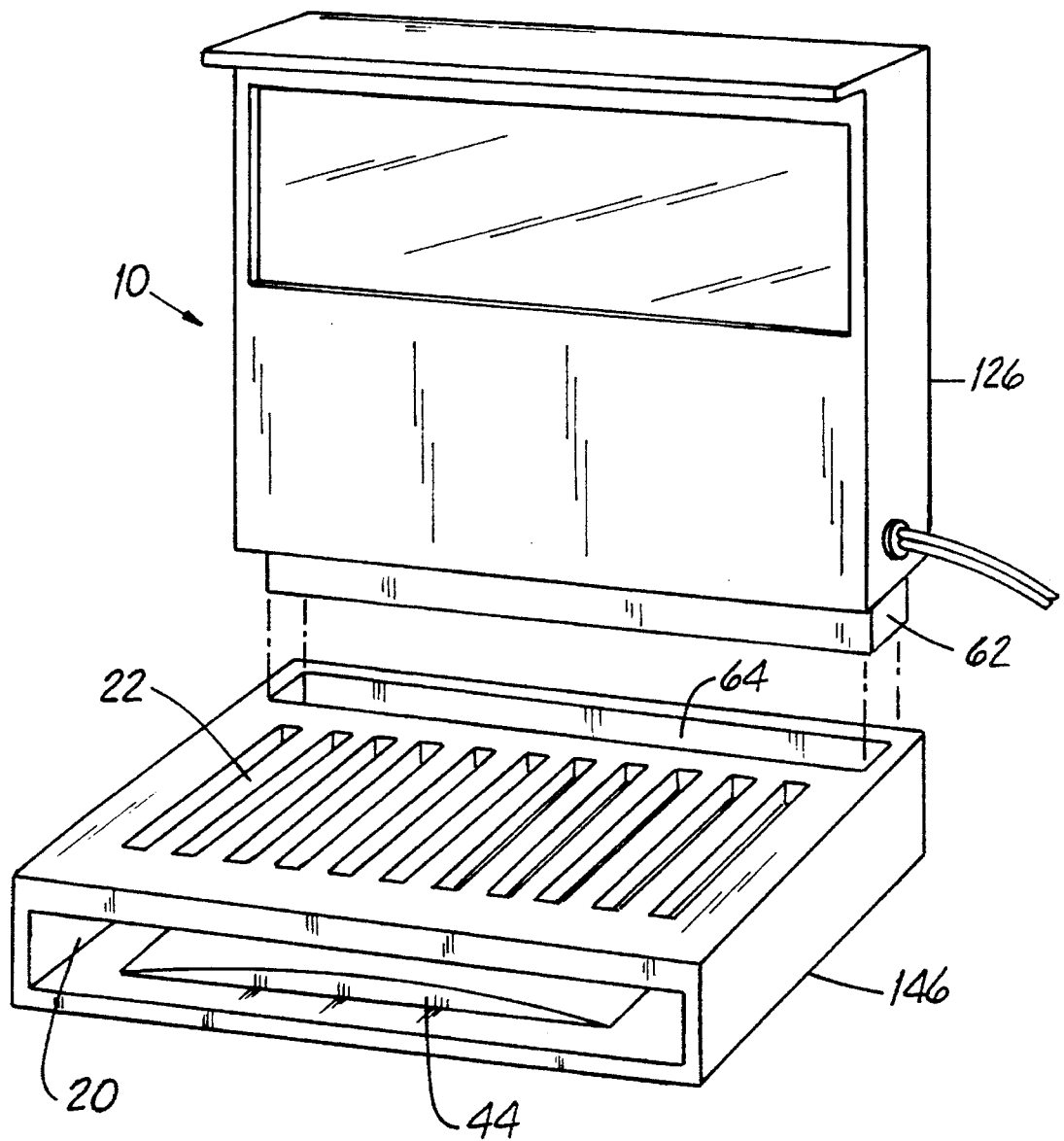
FIG. 11 is an exploded perspective drawing of a second structural embodiment of the flea trap.

FIGS. 11 and 12 show structurally different embodiments of the flea trap of the present invention. Any of the possible light source variations described above may be used in these embodiments of flea trap 10. The structures of insert tray 24 and base inner recess 20 are identical for all embodiments and variations, so, for simplicity, no details of these structures are depicted in these figures.

FIG. 11 illustrates an embodiment of flea trap 10 in which trap cover portion 12b and trap base portion 14b, instead of being joined by hinging means, are formed as completely separate units which, for operation of the trap, are joined by structural projection 62 on the lower side of trap cover portion 12b which fits into projection-accepting recess 64 at the back of trap base portion 14b.

In the embodiments of flea trap 10 illustrated by FIGS. 1–10 and by FIG. 11, trap cover portion 12 and trap base portion 14 can be folded against each other when the trap is not in use, such as shipping and storage times. As well as saving space, this configuration, which allows the trap to exist in both open and closed positions, also serves to protect the trap itself from damage during such times.

In the flea trap of FIG. 12, trap "cover" portion 12b, (which, in this variation, no longer functions as a cover), trap "base" portion 14b, and trap grill structure 22b are formed as a single continuous unit of fixed configuration.

While this embodiment of flea trap 10 lacks the "open or closed" feature of the previous embodiments, its virtue is simplicity and therefore economy of manufacturing.

One possible modification of all embodiments and variations of the trap would be to make the orientation of the light source itself variable. Such means for changing the orientation of the light source, which could be an electrically operated eccentric camming mechanism, would direct the light emitted from the light source over a wider area than could be directly covered by a stationary light source, somewhat in the way an oscillating fan sweeps its air current in an arc rather than directing the air in a fixed straight line.

The operation of the light source of the trap could be also modified by adding a means for intermittently changing the effective intensity of light emitted from the light source of the trap, as disclosed by U.S. Pat. No. 5,231,790 to Dryden, "Flea Trap".

A further possible operational variation of the insect trap would be to have a keying mechanism connecting the insert and the electrical circuit that powers the light source. Such a mechanism would prevent the trap from operating unless and until the insert had been properly inserted. Possible keying activation mechanisms could include magnetic reed switches, optical sensors or readers, or interruptible beams of lights. Since it is light that attracts fleas to the trap, the trap functions most effectively when there are no competing light sources in the vicinity. Thus, a photo cell sensor, which could turn the light on when the room is dark, and off when the room is lighted, could also be incorporated into the trap to ensure the optimum timing of operations of the trap.

Other modifications of the flea trap of the present invention will become apparent to those skilled in the art from an examination of the above patent specifications and drawings. Therefore, other variations of the present invention may be made which fall within the scope of the following claims, even though such variations were not specifically discussed above.

INDUSTRIAL APPLICABILITY

The flea trap of the present invention can be used to control populations of fleas in any environment. It is intended primarily for indoor consumer flea control use. The user of the trap would typically set up and activate the trap on the floor of a living or other room, or even in proximity to the sleeping area of a pet. The compact and durable nature of the trap makes it easily to ship, store, and use.

The flea trap is also useful as a monitoring device, for sometimes the trap catches fleas when the population has not yet risen to the level that the infestation has become an irritant to humans in the environment.

What we claim is:

1. A trap for catching insects comprising:
   a. a trap housing comprising a trap back portion and a trap base portion interconnected so that the trap back portion and the trap base portion are oriented at essentially right angles to each other, the trap back portion comprising a trap back outer surface, with two or more walls extending outwardly from the trap back outer surface to define a trap back inner recess, the trap base portion comprising a trap base outer surface, with two or more walls extending upwardly from the trap base outer surface to define a trap base inner recess,
   b. a light source located within the trap back portion and above the level of the trap base portion, the light source being located within the trap back inner recess,
   c. energy supply means attached to the light source, and
   d. means for catching insects located within the trap base inner recess of the trap base portion and including an insert structure having an adhesive upper surface and, within the trap base portion, an upwardly open trap base inner recess, the trap base inner recess having sides, one of which includes an opening through which the insert structure may be inserted or removed.

2. A trap for catching insects according to claim 1 wherein the adhesive material is a pad of sequentially detachable adhesive sheets bearing adhesive material on one surface, the pad being affixed to the upper surface of the insert structure.

3. A trap for catching insects according to claim 1 wherein the light source is a source of green light.

4. A trap for catching insects according to claim 1 wherein the light source comprises at least one incandescent bulb.

5. A trap for catching insects according to claim 4 wherein the incandescent bulb has a bulb socket and electrical connections which are all embedded into an insert molded module formed of plastic material.

6. A trap for catching insects according to claim 1 wherein the light source comprises at least one LED unit.

7. A trap for catching insects according to claim 6 wherein the LED unit is interconnected with a light screen so that light emitted from the LED unit is transmitted into and illuminates the light screen.

8. A trap for catching insects according to claim 1 wherein the adhesive material located on the insert structure is covered by a grill structure located within the trap base portion of the housing.

9. A trap for catching insects according to claim 1 wherein the energy supply means is an electric plug connected to the trap by a conductive cord, the plug being constructed to fit into an electrical socket powered with electric current.

10. A trap for catching insects according to claim 1 further comprising a diffuser screen located in front of the light source within the trap back portion of the housing.

11. A trap for catching insects according to claim 1 wherein the light source further comprises means for intermittently altering the effective intensity of the light emitted from the light source.

12. A trap for catching insects according to claim 1 wherein the light source further comprises means for periodically altering the direction of the light emitted from the light source.

13. A trap for catching insects according to claim 1 wherein the trap back portion and trap base portion each have outer and inner edges and the trap back portion and trap base portion are integrally connected along their respective inner edges and the space between the outer edge of the trap back portion and the outer edge of the trap base portion is spanned by a grid structure, the trap back portion, the trap base portion and the grid structure thereby defining an essentially hollow interior, with the light source mounted upon the trap back portion and the means for catching insects located upon the trap base portion.

14. A trap for catching insects comprising:
   a. a trap housing comprising a trap back portion and a trap base portion interconnected so that the trap back portion and the trap base portion are oriented at essentially right angles to each other, the trap back portion and the trap base portion being moveably interconnected by hinging means, and the trap back portion being sufficiently large to substantially close from above the upwardly open trap base inner recess when the trap back portion has been hingedly closed over the trap base portion,
   b. a light source located within the trap back portion and above the level of the trap base portion,
   c. energy supply means attached to the light source, and
   d. means for catching insects located within the trap base portion, such means for catching insects including an insert structure having an adhesive upper surface and, within the trap base portion, an upwardly open trap base inner recess, the trap base inner recess having sides, one of which includes an opening through which the insert structure may be inserted or removed.

15. A trap for catching insects comprising:
   a. a trap housing comprising a trap back portion and a trap base portion interconnected so that the trap back portion and the trap base portion are oriented at essentially right angles to each other, the trap back portion and the trap base portion each having inner edges at the location where the trap back portion and trap base portion most closely approach each other, and the trap back portion and the trap base portion being detachably connected by mating connection means located along the respective inner edges of the trap back portion and the trap base portion,
   b. a light source located within the trap back portion and above the level of the trap base portion,
   c. energy supply means attached to the light source, and
   d. means for catching insects located within the trap base portion, such means for catching insects including an insert structure having an adhesive upper surface and, within the trap base portion, an upwardly open trap base inner recess, the trap base inner recess having sides, one of which includes an opening through which the insert structure may be inserted or removed.

16. A trap for catching insects comprising:
   a. a trap housing comprising a trap back portion and a trap base portion interconnected so that the trap back portion and the trap base portion are oriented at essentially right angles to each other,
   b. a light source located within the trap back portion and above the level of the trap base portion,
   c. energy supply means attached to the light source, and
   d. means for catching insects located within the trap base portion, such means for catching insects including an insert structure having an adhesive upper surface and, within the trap base portion, an upwardly open trap base inner recess, the trap base inner recess having sides, one of which includes an opening through which the insert structure may be inserted or removed,
   wherein the surface of the inner recess of the trap base portion has at least one insert guide rib extending upwardly therefrom and the insert structure has at least one channel formed therein, the guide rib and channel being constructed and located so that when the insert structure is inserted into the trap base portion, the guide rib and channel mate.

17. A trap for catching insects according to claim 16 wherein the insert structure has four perimeter sides and, along three of the four perimeter sides, upwardly extending wall structures, and an insert central section extending between those wall structures, the insert central section having a curved configuration and the trap base portion of the trap having a pair of curved insert guide structures which define a curved slot into which the insert structure removably fits to be inserted into and withdrawn from the inner recess of the trap base portion.

18. A trap for catching insects comprising:
   a. a trap housing comprising a trap back portion and a trap base portion interconnected so that the trap back portion and the trap base portion are oriented at essentially right angles to each other,
   b. a light source located within the trap back portion and above the level of the trap base portion, the light source further comprising means for periodically altering the direction of the light emitted from the light source, the means for altering the direction of the light emitted from the light source comprising an eccentric camming mechanism which sequentially changes the orientation of the light source within the trap for catching insects, c. energy supply means attached to the light source, and d. means for catching insects located within the trap base portion, such means for catching insects including an insert structure having an adhesive upper surface and, within the trap base portion, an upwardly open trap base inner recess, the trap base inner recess having sides, one of which includes an opening through which the insert structure may be inserted or removed.

19. A trap for catching insects comprising:

a trap housing including a trap cover portion connected by hinging means to a trap base portion constructed and arranged whereby the trap cover portion and trap base portion are positionable in a first, open, position, in which the trap cover portion and the trap base portion are oriented at essentially right angles to each other, and in a second, closed, position, in which the trap cover portion and the trap base portion are folded against each other, a light source located within the trap cover portion, energy supply means attached to the light source, and means for catching insects located within the trap base portion of the housing.

20. A trap for catching insects according to claim 19 wherein the trap cover portion comprises a trap cover outer surface and two or more walls extending outwardly from the outer surface to define a trap cover inner recess, the trap base portion comprises a trap base outer surface, and two or more walls extending upwardly from the trap base outer surface to define a trap base inner recess, the light source being located within the trap cover inner recess, and the means for catching insects located within the trap base inner recess.

21. A trap for catching insects according to claim 19 wherein the means for catching insects is an adhesive material located on an insert structure removably placed within the trap base inner recess.

22. A trap for catching insects according to claim 19 wherein the adhesive material located on the insert structure is covered by a grill structure located within the base portion of the housing.

23. A trap for catching insects according to claim 19 wherein the insert structure is removably insertable into the trap base inner recess through an opening in one of the walls extending upwardly from the trap base outer surface.

24. A trap for catching insects according to claim 19 wherein the light source is a source of green light.

25. A trap for catching insects according to claim 19 wherein the light source comprises at least one incandescent bulb.

26. A trap for catching insects according to claim 25 wherein the incandescent bulb has a bulb socket and electrical connections which are all embedded into an insert molded module formed of plastic material.

27. A trap for catching insects according to claim 19 wherein the light source comprises at least one LED unit.

28. A trap for catching insects according to claim 27 wherein the LED unit is interconnected with a light screen so that light emitted from the LED unit is transmitted into and illuminates the light screen.

29. A trap for catching insects according to claim 21 wherein the adhesive material located on the insert structure is covered by a grill structure located within the trap base portion of the housing.

30. A trap for catching insects according to claim 19 wherein the energy supply means is an electric plug connected to the trap by a conductive cord, the plug being constructed to fit into an electrical socket powered with electric current.

31. A trap for catching insects according to claim 19 further comprising a diffuser screen located in front of the light source within the trap back portion of the housing.

32. A trap for catching insects according to claim 23 wherein the light source further comprises means for intermittently altering the effective intensity of the light emitted from the light source.

33. A trap for catching insects according to claim 19 wherein the light source further comprises means for altering the direction of the light emitted from the light source.

34. A trap for catching insects according to claim 33 wherein the means for altering the direction of the light emitted from the light source comprises a eccentric camming mechanism which sequentially changes the orientation of the light source within the trap for catching insects.

35. A trap for catching fleas comprising:

a trap housing comprising a cover portion having a trap cover outer surface, and two or more walls extending outwardly from the perimeter edges of the trap cover outer surface to define a trap cover inner recess, and a trap base portion comprising a trap base outer surface, and two or more walls extending upwardly from the perimeter edges of the trap base outer surface to define a trap base inner recess, the trap cover portion and the trap base portion being movably connected by hinging means so that the trap cover portion and trap base portion are positionable in a first, open position, in which the trap cover portion and the trap base portion are oriented at essentially right angles to each other, and a second, closed position, in which the trap cover portion and the trap base portion are folded against each other, a source of green light located within the trap cover inner recess, means for supplying electrical energy to the source of green light, and an insert structure containing an adhesive material that is removably insertable into the trap base inner recess through an insert opening in the trap base portion.

36. A trap for catching fleas according to claim 35 wherein the adhesive material located on the insert structure is covered by a grill structure located within the base portion of the housing.

37. A trap for catching fleas according to claim 35 wherein the light source comprises at least one LED unit.

38. A trap for catching fleas according to claim 35, the source of green light further comprising a light screen to which the LED unit is connected so that light emitted from the LED unit is transmitted into and illuminates the light screen.

39. A trap for catching insects according to claim 35 wherein the adhesive material located on the insert structure is covered by a grill structure located within the trap base portion of the housing.

40. A trap for catching insects according to claim 35 wherein the energy supply means is an electric plug connected to the trap by a conductive cord, the plug being constructed to fit into an electrical socket powered with electric current.

41. A trap for catching insects according to claim 35 further comprising a diffuser screen located in front of the light source within the trap back portion of the housing.

42. A trap for catching insects according to claim 35 wherein the light source further comprises means for intermittently altering the effective intensity of the light emitted from the light source.

43. A trap for catching insects according to claim 35 wherein the light source further comprises means for altering the direction of the light emitted from the light source.

44. A trap for catching insects according to claim 35 wherein the means for altering the direction of the light emitted from the light source comprises an eccentric camming mechanism which sequentially changes the orientation of the light source within the trap for catching insects.

45. A trap for catching fleas according to claim 35, further comprising a mechanical on-off switch which activates the light source when the trap is in the open position and turns the light source off when the trap is in the closed position.

46. A trap for catching fleas comprising a flea attractant containing portion and an flea trapping portion, the flea attractant containing portion comprising:

a trap housing comprising a trap cover portion having a trap cover outer surface, and two or more walls extending outwardly from edges of the trap cover outer surface to define a trap cover inner recess, the trap cover portion being movably connected by hinging means so that the trap cover portion and trap base portion are positionable in a first, open position, in which the trap cover portion and the trap base portion are oriented at essentially right angles to each other, and in a second, closed position, in which the trap cover portion and the trap base portion are folded against each other, a source of light located within the trap cover inner recess, means for supplying electrical energy to the source of light;

the flea trapping portion comprising:

an insert structure containing an adhesive material that is removably insertable into the trap base inner recess through an insert opening in the trap base portion, the insert structure having, along three of its four perimeter sides, upwardly extending wall structures, and an insert central section extending between those wall structures, the insert central structure having a curved configuration, and the base portion of the trap having a pair of curved insert guide structures which define a curved insert slot into which the insert central section removably fits.

47. A trap for catching fleas according to claim 46 wherein the adhesive material located on the insert structure is covered by a grill structure located within the base portion of the housing.

48. A trap for catching fleas according to claim 46 wherein the adhesive material is a pad of sequentially detachable adhesive sheets bearing adhesive material on one surface, the pad being affixed to the upper surface of the insert structure.

49. A trap for catching fleas according to claim 46 wherein the insert structure is constructed and arranged to be removably insertable into the trap base inner recess through an opening in one of the upwardly extending walls of the trap base portion.

50. An insert structure for use in a trap for catching insects, the trap for catching insects having a trap cover portion containing a light source and a trap base portion having an inner recess located therein, the insert structure having, along three of its four perimeter sides, upwardly extending wall structures, and an insert central section extending between those wall structures, the insert central structure having a curved configuration, the insert structure being constructed and arranged to be insertable into the trap base inner recess of the trap base portion through an insert opening in the trap base portion, the insert opening of the trap base portion having a pair of curved insert guide structures which define a curved slot into which the insert trapping insert structure removably fits, the insert central section having on the upper surface thereof an adhesive material.

51. An insect trapping insert structure according to claim 50 wherein the adhesive material is a layer of adhesive material applied to the upper surface of the insert structure.

52. An insect trapping insert structure according to claim 50 wherein the adhesive material is a pad of sequentially detachable adhesive sheets bearing adhesive material on one surface, the pad being affixed to the upper surface of the insert structure.

53. A method of controlling a population of insects comprising:

placing an insect trap having an insect attracting and an insect trapping portion at or near floor level in a location infested with the insects to be controlled, activating the insect attracting portion, allowing the trap to remain in the location in which it was placed for a period of time sufficient to trap the desired number of insects, and removing and disposing of the insect trapping portion with the insects trapped therein, the insect trap comprising:

a trap housing including a trap cover portion interconnected to a trap base portion so that the trap housing can be positioned alternatively in an open and closed position, whereby in the open position the trap back portion and the trap base portion are oriented at essentially right angles to each other, a light source located within the trap cover portion of the housing, energy supply means attached to the light source, and means for catching insects located within the trap base portion.

54. A method of controlling a population of insects according to claim 53 wherein the trap cover portion and the trap base portion of the housing are movably interconnected by hinging means.

55. A method of controlling a population of insects according to claim 53 wherein the top cover portion and trap base portion are detachably connected by mating connection means located along the respective inner edges of the trap cover portion and the trap base portion.

56. A method of controlling a population of insects according to claim 53 wherein the trap cover portion comprises a trap cover outer surface, and two or more walls extending outwardly from the outer surface to define a trap cover inner recess, the trap base portion comprising a trap base outer surface, and two or more walls extending upwardly from the trap base outer surface to define a trap cover inner recess, the light source being located within the trap cover inner recess and the means for catching insects being located within the trap base inner recess.

57. A method of controlling a population of insects according to claim 53 wherein the means for catching insects is an adhesive material located on an insert structure removably placed within the trap base inner recess.

58. A method of controlling a population of insects according to claim 53 wherein the insert structure is constructed and arranged to be removably insertable into the inner recess of the trap base portion through an opening in one of the upwardly extending walls of the trap base portion.

59. A method of controlling a population of insects according to claim 53 wherein the surface of the inner recess of the trap base portion has at least one guide rib extending upwardly therefrom and the insert structure has one or more channels formed into one side thereof, the guide rib and channel being constructed and located so that when the insert structure is inserted into the trap base portion of the trap, they mate.

60. A method for controlling a population of insects according to claim 53 wherein the insert structure has, along three of its four perimeter sides, upwardly extending wall structures, and an insert central section extending between those wall structures, the insert central structure having a curved configuration and the trap base portion of the trap having a pair of curved insert guide structures which define a curved insert slot into which the insert central section removably fits.

61. A method of controlling a population of insects according to claim 53 wherein the trap cover portion comprises a trap cover outer surface, and two or more walls extending outwardly from the trap cover outer surface to define a trap cover inner recess, the trap base portion comprises a trap base outer surface, and two or more walls extending upwardly from the trap base outer surface to define a trap base inner recess, the light source being located within the trap cover inner recess, and the means for catching insects being located within the trap base inner recess.

62. A method for controlling a population of insects according to claim 57 wherein the adhesive material is a pad of sequentially detachable adhesive sheets bearing material on one surface, the pad being affixed to the upper surface of the insert structure.

63. A method for controlling a population of insects according to claim 57 wherein the insert structure is constructed and arranged to be removably insertable into the inner recess of the trap base portion through an opening in one of the upwardly extending walls of the trap base portion.

64. A method for controlling a population of insects according to claim 53 wherein the light source is a source of green light.

65. A method for controlling a population of insects according to claim 53 wherein the light source comprises at least one incandescent bulb.

66. A method for controlling a population of insects according to claim 65 wherein the incandescent bulb has a bulb socket and electrical connections which are all embedded into an insert molded module formed of plastic material.

67. A method for controlling a population of insects according to claim 53 wherein the light source comprises at least one LED unit.

68. A method of controlling a population of insects according to claim 67 wherein the LED unit is interconnected with a light screen so that light emitted from the LED unit is transmitted into and illuminates the light screen.

69. A method of controlling a population of insects according to claim 53 wherein the adhesive material located on the insert structure is covered by a grill structure located within the base portion of the housing.

70. A method of controlling a population of insects according to claim 53 wherein the energy supply means is an electric plug connected to the trap by a conductive cord, the plug being constructed to fit into an electrical socket powered with electric current.

71. A method of controlling a population of insects according to claim 53 further comprising a diffuser screen located in front of the light source within the trap cover portion of the housing.

72. A method of controlling a population of insects according to claim 53 wherein the light source further comprises means for intermittently altering the effective intensity of the light emitted from the light source.

73. A method of controlling a population of insects according to claim 53 wherein the light source further comprises means for altering the direction of the light emitted from the light source.

74. A method of controlling a population of insects according to claim 73 wherein the means for altering the direction of the light emitted from the light source comprises an eccentric camming mechanism which sequentially changes the orientation of the light source within the trap for catching insects.

75. A method of controlling a population of fleas comprising:

placing a flea trap having a flea attracting portion and a flea trapping portion at or near floor level in a location infested with the fleas to be controlled, activating the flea attracting portion, allowing the trap to remain in the location in which it was placed for a period of time sufficient to trap the desired number of fleas, and removing and disposing of the flea trapping portion with the fleas trapped therein, the flea trap comprising:

the flea attractant containing portion comprising:

a trap housing comprising a trap cover portion having a trap cover outer surface, and two or more walls extending outwardly from edges of the trap cover outer surface to define a trap cover inner recess, the trap cover portion being movably connected by hinging means so that the trap cover portion and trap base portion are positionable in a first, open position, in which the trap cover portion and the trap base portion are oriented at essentially right angles to each other, and in a second, closed position, in which the trap cover portion and the trap base portion are folded against each other, a source of light located within the trap cover inner recess, means for supplying electrical energy to the source of light;

the flea trapping portion comprising:

an insert structure containing an adhesive material that is removably insertable into the trap base inner recess through an insert opening in the trap base portion, the insert structure having, along three of its four perimeter sides, upwardly extending wall structures, and an adhesive insert central section extending between those wall structures, the adhesive insert central structure having a curved configuration, and the base portion of the trap having a pair of curved insert guide structures which define a curved slot into which the adhesive insert central section removably fits.

76. A method of controlling a population of fleas according to claim 75 wherein the surface of the inner recess of the trap base portion has at least one guide rib extending upwardly therefrom and the insert structure has at least one guide channel formed into one side thereof, the guide rib and guide channel being constructed and located so that when the insert structure is inserted into the trap base portion, they mate.

77. A method for controlling the population of fleas according to claim 75 where the adhesive material is a layer of adhesive material applied to the upper surface of the insert structure.

78. A method for controlling a population of fleas according to claim 75 wherein the adhesive material is a pad of sequentially detachable adhesive sheets bearing adhesive material on one surface, the pad being affixed to the upper surface of the insert structure.

79. A method for controlling a population of fleas according to claim 75 wherein the light source is a source of green light.

80. A method for controlling a population of fleas according to claim 75 wherein the light source comprises at least one incandescent bulb.

81. A method for controlling a population of fleas according to claim 75 wherein the light source comprises at least one LED unit.

82. A method of controlling a population of fleas according to claim 81 wherein the LED unit is interconnected with a light screen so that light emitted from the LED unit is transmitted into and illuminates the light screen.

83. A method of controlling a population of fleas according to claim 75 wherein the adhesive material located on the insert structure is covered by a grill structure located within the base portion of the housing.

84. A method of controlling a population of fleas according to claim 75 wherein the energy supply means is an electric plug connected to the trap by a conductive cord, the plug being constructed to fit into an electrical socket powered with electric current.

85. A method of controlling a population of fleas according to claim 75 wherein the trap cover portion and the trap base portion of the housing are interconnected by hinging means.

86. A method of controlling a population of fleas according to claim 75 further comprising a diffuser screen located in front of the light source within the back portion of the housing.

87. A method of controlling a population of fleas according to claim 75 wherein the light source further comprises means for intermittently altering the effective intensity of the light emitted from the light source.

88. A method of controlling a population of fleas according to claim 75 wherein the light source further comprises means for altering the direction of the light emitted from the light source.

89. A method of controlling a population of fleas according to claim 75 wherein the means for altering the direction of the light emitted from the light source comprises an eccentric camming mechanism which sequentially changes the orientation of the light source within the trap for catching insects.

90. A method of controlling a population of fleas according to claim 75 further comprising a mechanical on-off switch which activates the light source when the trap is in the open position and turns the light source off when the trap is in the closed position.

* * * * *